United States Patent [19]
Johnson et al.

[11] Patent Number: 5,982,144
[45] Date of Patent: Nov. 9, 1999

[54] RECHARGEABLE BATTERY POWER SUPPLY OVERCHARGE PROTECTION CIRCUIT

[75] Inventors: Lonnie G. Johnson, Smyrna; Yong Su, Atlanta, both of Ga.

[73] Assignee: Johnson Research & Development Company, Inc., Smyrna, Ga.

[21] Appl. No.: 08/892,449

[22] Filed: Jul. 14, 1997

[51] Int. Cl.⁶ .................................. H02J 7/00; H02H 9/00
[52] U.S. Cl. ............................. 320/122; 320/162; 361/56
[58] Field of Search ..................................... 320/122, 162; 361/91, 82, 84, 56

[56] References Cited

U.S. PATENT DOCUMENTS

| | | | |
|---|---|---|---|
| 3,237,078 | 2/1966 | Mallory | 320/122 |
| 3,393,355 | 7/1968 | Whoriskey et al. | 320/122 |
| 4,303,877 | 12/1981 | Meinhold | 320/6 |
| 4,614,905 | 9/1986 | Petersson et al. | 320/120 |
| 4,719,401 | 1/1988 | Altmejd | 320/13 |
| 5,270,635 | 12/1993 | Hoffman et al. | 320/122 |
| 5,291,116 | 3/1994 | Feldstein | 320/119 |
| 5,387,857 | 2/1995 | Honda et al. | 320/18 |
| 5,783,928 | 7/1998 | Okamura | 320/122 |
| 5,821,733 | 10/1998 | Turnbull | 320/116 |

OTHER PUBLICATIONS

Zetex Semiconductors, Adjustable regulator suits low voltage application, Sep. 1996.
Zetex Semiconductors, "Adjustable precision zener shunt regulator", Mar. 1998.
Zetex Semiconductors, "The SR2431 Low Reference Voltage Shunt Regulator", Design Note 37, Issue 1, Jun. 1996.

*Primary Examiner*—Peter S. Wong
*Assistant Examiner*—Gregory J. Toatley, Jr.
*Attorney, Agent, or Firm*—Kennedy, Davis & Hodge

[57] ABSTRACT

A rechargeable power supply overcharge protection circuit is provided with shunt circuits that shunt current about a battery or battery cell (15, 16 and 17) of a string of battery cells when it is charged to a maximum charge limit. The shunt circuit includes shunt regulators (20) connected across each battery cell.

5 Claims, 2 Drawing Sheets

| R1 | Resistor | 1 ohm |
| R2 | Resistor | 220 ohms |
| R3 | Resistor | 220 ohms |
| R4 | Resistor | 470k ohms |
| R5 | Resistor | 120k ohms |
| R6 | Resistor | 5.1 ohms |
| R7 | Resistor | 240k ohms |
| R8 | Resistor | 390k ohms |
| 15 | Battery | 4.1 V |
| 16 | Battery | 4.1 V |
| 17 | Battery | 4.1 V |

RECHARGEABLE BATTERY POWER SUPPLY OVERCHARGE PROTECTION CIRCUIT

TECHNICAL FIELD

This invention relates generally to power supplies comprised of one or more rechargeable batteries and more specifically to power supplies having protective circuitry means for preventing battery overcharge.

BACKGROUND OF THE INVENTION

In motive and standby applications, battery modules or cells are connected in series to provide desired voltage levels for various applications. Most of these battery systems in use today are operating without individual battery cell management. However, placing battery cells in series presents a problem with respect to the reliable and efficient recharging of the cells, specifically the overcharging or undercharging of the individual cells. Overcharged cells lose service life while undercharged ones fail to have their prescribed energy storage capacity.

Different battery cells loose their charges at different rates. Also, different cells have uneven leakage current, thereby yielding different shelf lives. For optimal battery performance it is best to charge all cells to the same voltage, while not overcharging any cell within the string. The importance of preventing overcharging varies with different types of batteries. For example, nicad batteries can be overcharged somewhat without causing damage to the battery. Thus, battery charging systems for nicad batteries have been devised which simply charge the battery without monitoring its charge and rapidly removing the battery from the charging system upon its becoming fully charged. However, other types of batteries, such as lithium ion batteries, are very sensitive to overcharging and become damaged thereby. Hence, these types of batteries cannot be used with nicad battery chargers without causing damage.

Unequalized charge state problems with individual battery cells in a string have been addressed previously. For example, individual battery cells have been monitored and charged first with a main charger and then individually charged using a relatively smaller independent charger, an example of such is that shown in U.S. Pat. No. 5,438,250. This method of charging batteries is inefficient and incapable of charging a string of batteries with a single power source.

Another method of battery management has been to use zener diodes to shunt current about fully charged individual cells, as shown in U.S. Pat. No. 4,719,401. Zener diodes however do not have a user selectable voltage level. Additionally, zener diodes have a leakage current of approximately 0.5 mA. A leakage current of this magnitude is often unacceptable as it significantly reduces the shelf life of the battery. Also, zener diode circuits cannot be easily adapted to charge different voltage batteries. As this restriction limits the zener diode circuit to one shunting voltage, the charger can only recharge batteries of one selected maximum voltage. However, it may be desired to have a charging circuit which may accept and recharge batteries of different potential capacities.

Battery recharging apparatuses have been designed wherein a battery shunting circuit is controlled through a series of diodes or a transistor, as shown in U.S. Pat. No. 5,387,857. With a series of diodes, the diodes are connected in series across the battery cell. Voltage is set to the maximum level of the fully charged battery cell. This arrangement however has a leakage current in the order of milli-amps before the diodes are turned on. This large leakage current significantly reduces the shelf-life of the battery. Also, the voltage across each forward biased diode is approximately 0.6 volts to 1.2 volts depending upon the current across it. This wide variation in voltages make it difficult to use several diodes to set a precise voltage level to protect a specific battery cell. Additionally, if the maximum voltage of a cell is large, it is impractical to use many diodes in series to bypass merely one cell.

With the transistor embodiment of U.S. Pat. No. 5,387,857, resistors are connected as a voltage divider across the battery cell. The divider sets the turn-on state of a transistor, which is shunted across the battery cell. To make the transistor bypass a large current, on the order of hundreds of milli-amps, as may be the case when the battery cell is fully charged, the resistors should be small enough to drive the transistor's base current to several milli-amps. These small resistors produce a very large leakage current across the battery cell. Thus, both these embodiments too are plagued with a large leakage current across the battery cell which significantly reduces the shelf-life of the battery. Also, when the transistor is turned on, the voltage across the collector and the emitter changes depending on the collector current. As such, it is difficult to set a precise voltage level. Additionally, the transistor has a slow turn-on speed which may lead to transient overcharging of a battery cell.

It thus is seen that a need remains for a rechargeable power supply that has efficient overcharge protection. Accordingly, it is to the provision of such that the present invention is primarily directed.

SUMMARY OF THE INVENTION

Briefly described, a rechargeable power supply comprises a string of rechargeable batteries such as lithium ion batteries. Each battery in the string has a shunt circuit connected across it that includes a shunt regulator with its reference voltage terminal operatively coupled to the battery, preferably via a voltage divider that is connected across the battery. The power supply also has a bypass circuit connected across the battery string by means of another shunt regulator. With this construction, once individual batteries in the string become fully charged the recharging current is shunted around them through its shunt circuit while the other batteries continue to be recharged. Once the entire string is fully charged, the recharge current passes through the bypass circuit.

DETAILED DESCRIPTION

Figure 1:
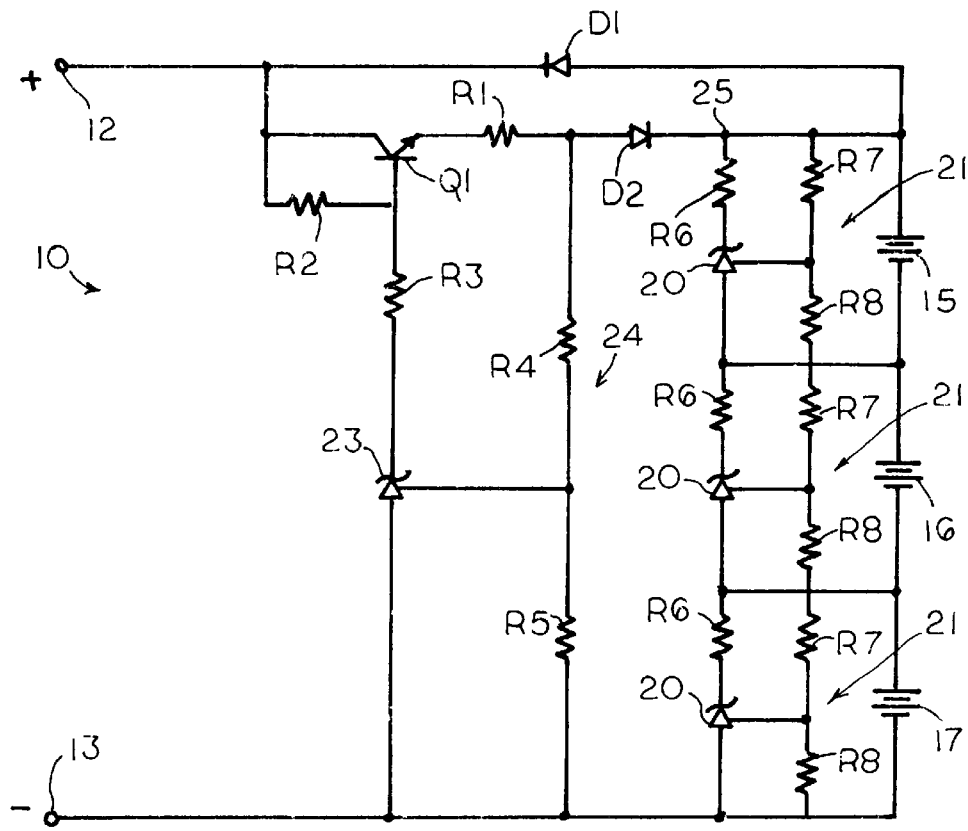
FIG. 1 is a diagram of a rechargeable power supply overcharge protection circuit illustrating principles of the invention in a preferred form.
Figures 3, 4:
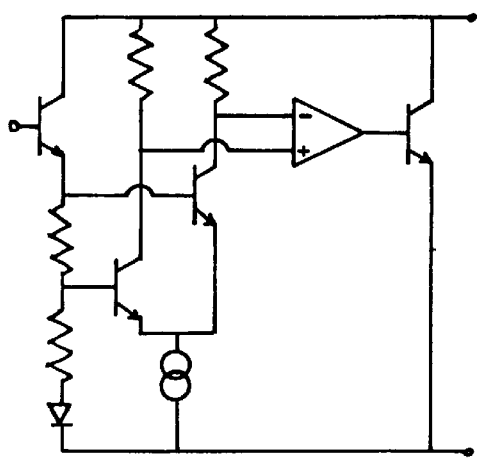
FIG. 3 is a table of values of the components of the battery overcharge protection circuit of FIG. 1.
FIG. 4 is a circuit diagram of the shunt regulator in the circuit of FIG. 1.

With reference next to the drawing, there is shown in FIG. 1 a rechargeable power supply overcharge protection circuit having a plus terminal 12 and a negative terminal 13. A string of rechargeable batteries 15, 16 and 17 is connected in series circuit across the terminals through a diode D1. Preferably, each of the batteries is a lithium ion type battery. A voltage divider 21 is seen to be connected across each of the batteries and to be comprised each of a resistor R7 and a resistor R8. A current shunt circuit is also connectable across each of the batteries and the voltage divider. Each of the shunt circuits is seen to include a current limiting resistor R6 and a shunt regulator 20. The shunt regulator has its reference voltage terminal connected to its accompanying voltage divider between the two resistors R7 and R8. The power supply also has a bypass circuit connected across the battery string which includes resistors R2 and R3 and another shunt regulator 23. The bypass circuit also has a another voltage divider which includes resistors R4 and R5 which are connected across the resistors R2 and R3 and the shunt regulator 23 through a transistor Q1. The bypass circuit is seen to be connected across the battery string through another diode D2. Each of the shunt regulators 20 and 23 is preferably in the form of a zener shunt regulator such as a ZR431C made by Zetex Inc. of Commack, N.Y. as shown in FIG. 4.

In operation, the terminals 12 and 13 are connected across a recharger to recharge the battery string. Upon being connected across the recharger, each of the rechargeable batteries 15, 16 and 17 receives the charging current. Charging of each of the batteries continues until any of the batteries in the string reaches its fully charged potential. Once an individual battery reaches its fully charged potential the shunt regulator 20 and its shunt circuit is activated by its referenced voltage having now reached its point of operation. As shown in the drawing, this reference voltage is less than the fully charged voltage of the battery because it is connected to the voltage divider. This is done for ease in selection of the shunt regulator since a mismatch between its reference voltage and that of the fully charged potential of the battery can be adjusted by means of the selection of the values of the resistors in the voltage divider and the ease of changing the resistance of the divider to enable the current to recharge batteries of different maximum voltages. When the shunt regulator 20 is actuated, the shunt circuit is then connected across the battery whereby current then flows through the shunt regulator around the fully charged battery rather than through the battery, since its resistance is far less than that of the battery itself. Prior to this time very little current has flowed through the relatively high resistance voltage divider associated with that particular battery.

As the other batteries reach their fully charged condition, the same events occur in that such is sensed by its associated shunt regulator whereupon the low resistance shunt circuit around the battery is coupled across the battery thereby diverting the recharging current from the battery to its shunt circuit. This continues until the entire string has reached its fully charged state. When this occurs the bypass circuit is actuated whereupon current is thereafter diverted around the entire string of batteries, and each of their shunt circuits, through the bypass line comprised of the resistors R2, R3 and the shunt regulator 23. Once again, this is activated by means of the reference voltage input to the shunt regulator 23 achieving a preselected value which is in proportion to the voltage across the entire battery string. Once again, this voltage here is less than that across the entire voltage because of the inclusion of the voltage divider resistor R4, and R5. The voltage divider resistor R4, and R5 are again employed for ease in the selection and matching of the reference voltage of shunt regulator 23 to that of the battery string. Upon actuation of the shunt regulator 23, the voltage at the base of the transistor Q1 decreases turning transistor Q1 off. The emitter current of transistor Q1 decreases significantly and thereby prevents the total protection circuit from wasting energy.

When the circuit terminals 12 and 13 are coupled to a load and the batteries discharged, the discharging current flows from the battery cells 15, 16 and 17 to terminal 12 through diode D1.

Figure 2:
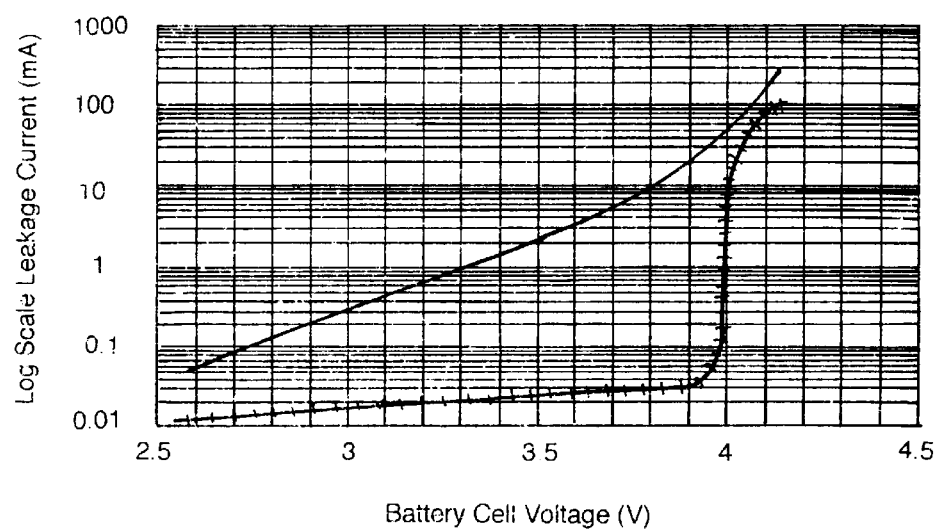
FIG. 2 is a graph illustrating a comparison between operations of a zener diode type battery overcharge protection circuit and the battery overcharge protection circuit of FIG. 1.

The just described battery protection circuit produces a leakage current which is generally less than 50 $\mu$A. It should be noted that this value is one tenth of the prior art leakage current shown in U.S. Pat. No. 4,719,401 which uses zener diodes to shunt a battery cell. FIG. 2 illustrates a comparison between the battery protection circuits utilizing zener diodes and those using shunt regulator circuit. The shunt regulator battery protection circuits produce a much smaller leakage current across the entire range of battery cell voltages. This advantage allows for greater shelf life of shunt regulator battery circuits as compared to zener diode battery protection circuits.

It should also be noted that by using shunt regulators rather than zener diodes the value at which the shunting circuit or loop is activated can be precisely set and changed by simply changing the resistance of resistors R7 and R8. Conversely, zener diodes have a specific, constant turn on voltage, and as such it is impossible to use the same zener diode as a shunting element for battery cells of different maximum voltages. Thus, the present invention allows greater flexibility in charging batteries of different maximum voltages by simply providing different resistances to the shunt regulators.

Zener diodes have the limitation that in order to have sufficient current flow to prevent overcharging at the desired battery voltage, it must have significant current flow at lower voltages. This bypass current flow under some conditions can be sufficiently high such that there is inadequate current to the battery to achieve a full charge. This problem does not occur with the just described embodiment.

The advantages of the shunt regulator type battery protection circuit is also a distinct advantage of battery protection circuits using transistors, as shown in FIG. 5 of U.S. Pat. No. 5,387,857. In order to make a transistor bypass the batteries a large current, in the order of hundreds of milliamps, must be used. This is accomplished through the use of small resistance resistors at R2 and R3 of U.S. Pat. No. 5,387,857. However, these small resistors will produce a very large leakage current across the battery cell which will be in the order of milli-amps. Again, this significantly reduces the shelf life of the battery. In the present invention, the resistors which are connected as voltage dividers may be made very large so that the leakage current therethrough is insignificant. It should also be noted that the turn on speed of the transistor is much slower than that of the shunt regulator. Therefore, once again the battery protection circuit utilizing the shunt regulators is more precise that those utilizing transistors. This precision prevents the accidental overcharging of the battery cells.

It thus is seen that a means is now provided for protecting an battery cell or the individual battery cells of a battery string from being excessively charged and without creating a significant leakage current. It should of course be understood that many modifications may be made to the specific preferred embodiment described herein without departure from the spirit and scope of the invention as set forth in the following claims.

We claim:

1. A rechargeable power supply comprising a rechargeable battery and means for protecting said battery from being excessively charged during a recharge mode of operation, and with said battery protecting means comprising a voltage divider connected across said battery, and a shunt circuit connected across said battery that includes a shunt regulator operatively coupled with said voltage divider, a second rechargeable battery connected in series with said rechargeable battery, a second voltage divider connected across said second rechargeable battery, and a second shunt circuit connected across said second rechargeable battery that includes a second shunt regulator operatively coupled with said second voltage divider, said second shunt circuit is also connected in series circuit with said first shunt circuit, a current bypass circuit and means for coupling said current bypass circuit across said first and second voltage dividers in response to said first and second rechargeable batteries both being recharged to said preselected fully charged potentials, whereby upon said battery or said second battery being charged to a preselected potential, current is shunted about the charged battery through the shunt circuit coupled thereto.

2. A rechargeable power supply comprising a string of rechargeable batteries having a plurality of rechargeable batteries connected in series circuit a plurality of battery shunt regulators with each battery shunt regulator connected across a different one of said rechargeable batteries, a bypass circuit connectable across said battery string that includes a shunt regulator having its reference voltage terminal operatively coupled with said battery string for connecting said bypass circuit across said battery string upon said battery string being charged to a preselected fully charged potential, and a bypass voltage divider connected across said battery string and wherein said bypass circuit shunt regulator is connected to said bypass voltage divider.

3. The rechargeable power supply of claim 2 wherein said plurality of battery shunt regulators is connected in series circuit to provide a string of battery shunt regulators, and wherein said string of battery shunt regulators is connected across both said battery string and said bypass circuit.

4. A method of charging or recharging a string of rechargeable batteries which comprises the steps of passing current through each battery until each battery reaches its fully charged state, independently shunting recharge current around each fully charged battery by operation of a shunt regulator, and shunting the recharge current around the battery string once all of the batteries are fully charged by operation of another shunt regulator.

5. The method of claim 4 wherein recharge current is independently shunted around each fully charged battery through a circuit, and where recharging current is shunted around the battery string through a circuit.

* * * * *